(12) United States Patent
Parks

(10) Patent No.: US 7,410,336 B2
(45) Date of Patent: Aug. 12, 2008

(54) TOOL FOR REWINDING WINCH BELTS

(76) Inventor: Richard Parks, 306 Manor Road, Canal, New Brunswick (CA) E5C 1M4

( * ) Notice: Subject to any disclaimer, the term of this patent is extended or adjusted under 35 U.S.C. 154(b) by 384 days.

(21) Appl. No.: 11/372,004

(22) Filed: Mar. 10, 2006

(65) Prior Publication Data
US 2007/0212186 A1 Sep. 13, 2007

(51) Int. Cl.
B60P 7/08 (2006.01)
(52) U.S. Cl. .................. 410/156; 410/103; 279/144
(58) Field of Classification Search .................. 410/12, 410/96, 100, 103, 156; 173/13, 49; 242/390, 242/532, 129.3; 254/266; 279/143–145; 81/436, 439, 461, 177.85, 35, 440, 73
See application file for complete search history.

(56) References Cited

U.S. PATENT DOCUMENTS

| 280,849 A | 7/1883 | Nelson |
| 1,045,461 A | 11/1912 | Tuttle |
| 3,321,188 A | 5/1967 | Unger |
| 5,791,844 A | 8/1998 | Anderson |
| 6,102,637 A | 8/2000 | Mocci |
| 6,139,233 A | 10/2000 | Wilsey |
| 6,398,470 B1 | 6/2002 | Mosley |
| 6,467,755 B2 | 10/2002 | Reilly et al. |
| 6,705,597 B1 | 3/2004 | Reilly et al. |
| 6,824,339 B1 | 11/2004 | Childers |
| 6,848,872 B2 | 2/2005 | Perkins, Jr. |
| 6,854,939 B2 * | 2/2005 | Im .............................. 410/100 |
| 6,916,143 B2 | 7/2005 | Guenther |

* cited by examiner

Primary Examiner—Stephen Gordon
(74) Attorney, Agent, or Firm—Mario Theriault

(57) ABSTRACT

The tool for rewinding winch belts has a C-shaped member having a pair of parallel arms, a transverse portion joining the arms, and a shaft extending from the transverse portion away from the arms along a rotational axis thereof. Each arm has a boss protruding therefrom, with both bosses protruding toward each other along a working axis. One of the bosses has an inclined end defining a straight side facing a working direction and an inclined surface facing a releasing direction. In another aspect, a clevis and a pin extending through a diameter of the shaft define an articulation axis of the tool, extending at right angle from the working axis and the rotational axis. The articulation of the pin and the articulation of the bosses in the holes through the socket of a winch jointly define an universal joint along the tool's rotational axis.

10 Claims, 1 Drawing Sheet

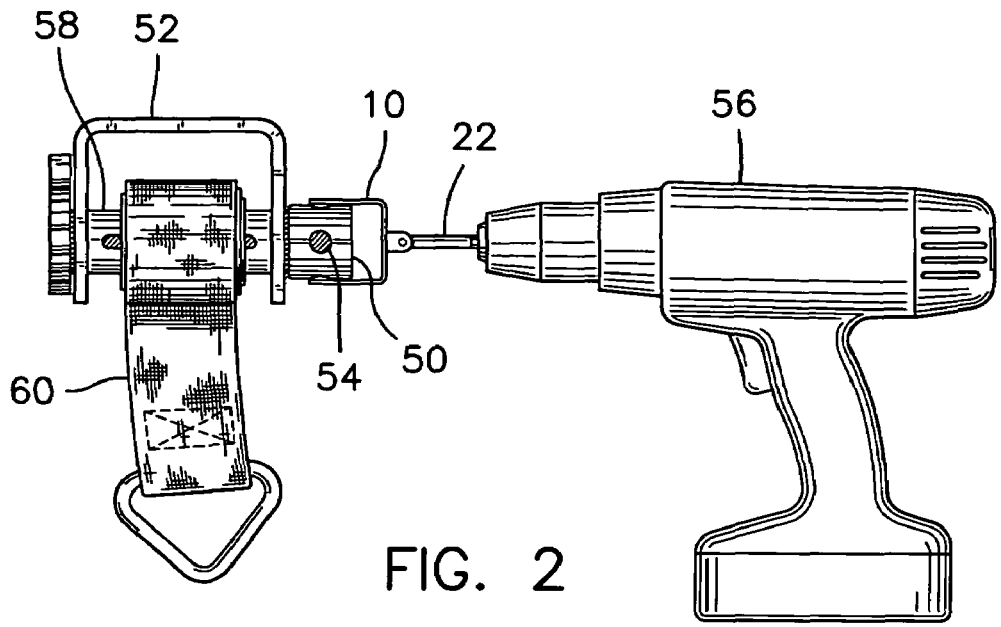
FIG. 2
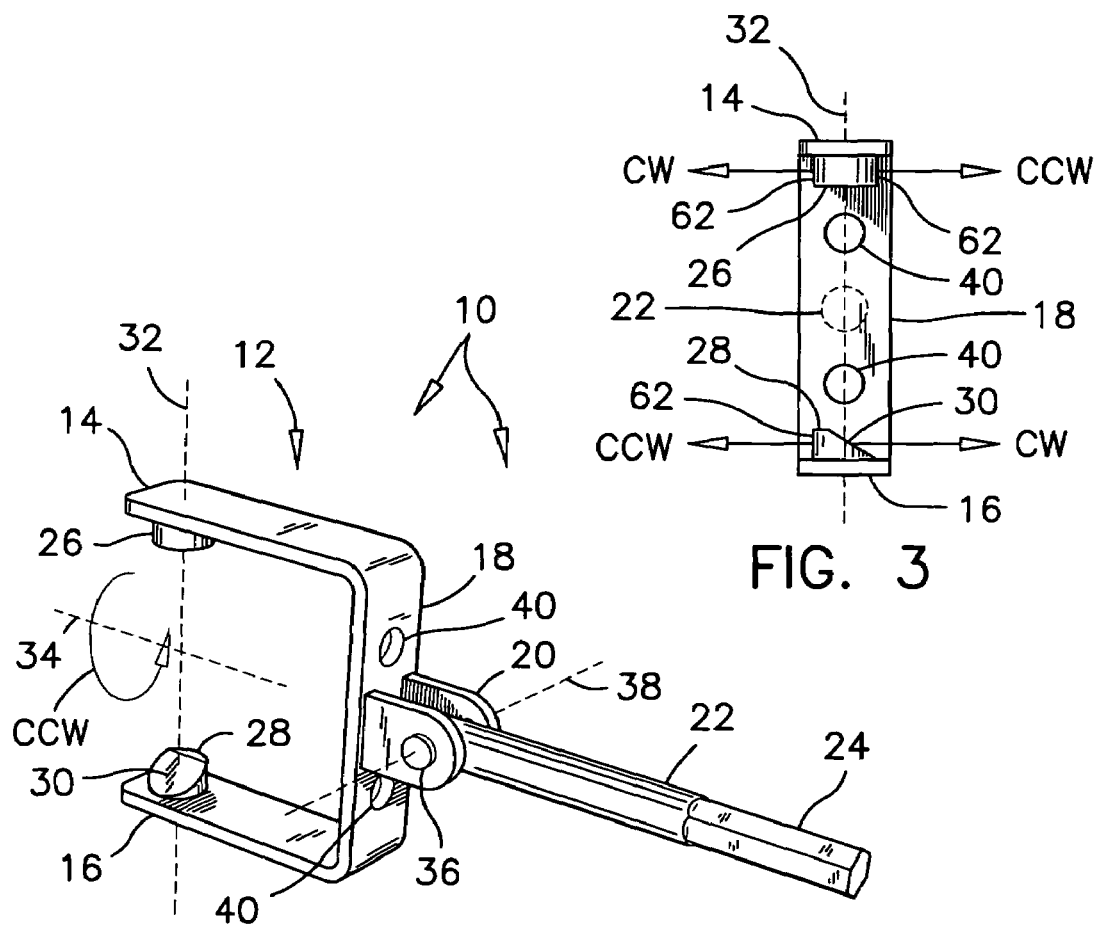
FIG. 3
FIG. 1

TOOL FOR REWINDING WINCH BELTS

FIELD OF THE INVENTION

This invention pertains to torque transmitting tools, and more specifically it pertains to a tool that is worked with a cordless drill for rewinding a belt on a winch as those found on flatbed transport trailers.

BACKGROUND OF THE INVENTION

A flatbed transport trailer normally has a series of belt-type winches along one side thereof. When the trailer is loaded, the belts from these winches extend over the load and are fastened to a rail on the other side of the trailer. Each winch has a spindle to which a belt is tied and wound. This spindle has a socket on its end. The socket is hollow and has four or more holes there through along its radii. A pry bar is inserted in a pair of holes to tighten the belt. A latch wheel and a pawl on the other end of the spindle prevent the spindle from giving slack to the belt.

When the trailer is unloaded, all these belts have to be rewound on the winches' spindles. While a pry bar is necessary for applying tension to each belt when these belts are deployed, it is not convenient for rewinding the belts.

A number of devices have been developed by others for rewinding winch belts. For example, U.S. Pat. No. 5,791,844 issued to R. D. Anderson on Aug. 11, 1998, discloses a portable crank assembly that can be mounted inside the socket on a belt winch to turn the spindle of the winch. The crank is mounted on a rubber bushing that is inserted inside the socket. A bolt through the rubber bushing and a wingnut are used to expand the rubber bushing inside the socket to grip the socket and to transmit a torque from the crank to the spindle.

It is also known that different brace-and-bit-like handles have been developed by others for rewinding winch belts. In each case, one end of the handle is inserted axially into the socket on the winch's spindle and has a bent portion that is engaged with one of the radial holes. The handle is rotated to turn the spindle in a rewinding direction. Examples of these manual tools are described in the following documents:

U.S. Pat. No. 6,102,637 issued to Joseph Mocci on Aug. 15, 2000;

U.S. Pat. No. 6,398,470 issued to Roger G. Mosley on Jun. 4, 2002;

U.S. Pat. No. 6,824,339 issued to John Ray Childers on Nov. 30, 2004;

U.S. Pat. No. 6,848,872 issued to Thelton Ray Perkins, Jr. on Feb. 1, 2005.

In another example of a winch belt rewinding tool, U.S. Pat. No. 6,916,143 issued to Marty Guenther on Jul. 12, 2005, discloses a bar-like tool which has an end section that is bent at a right angle from the handle portion, the end section is inserted through the socket across the diameter of the socket to rotate the spindle. In the rewinding position, the handle of the tool extends parallel with the axis of the spindle. In the tightening position, the handle is tilted to extend perpendicular with the axis of the spindle.

Although manual tools of the prior art deserve undeniable merits, cordless drills are commercially available and more and more people appreciate their usefulness in an increasing number of applications. The use of a cordless drill in the rewinding of winch belts on transport trailer has its advantages as it makes the job much easier and faster. These advantages are particularly appreciated when the belts must be rewound in inclement weather conditions.

The prior art contains at least two examples of power-driven winch belt rewinding tools. The following documents disclose tools driven by cordless drills. These tools engage with structural features inside the socket on the winch, and each has a stem that is adapted to mount into the chuck of a cordless drill. These documents are:

U.S. Pat. No. 6,139,233 issued to James T. Wilsey on Oct. 31, 2000;

U.S. Pat. No. 6,467,755 issued to Thomas J. Reilly et al. on Oct. 22, 2002.

It is believed that a power-driven tool engaging with a structural feature inside the socket of a winch can work very well when the winch is new. After several years of use of the winch, however, the socket is generally filled with dust; it can also be slightly deformed from excessive force on the pry bar that is used to tighten the belts; or it can be deteriorated from corrosion due to humidity, ice, snow and road salt. In these conditions, the latter-mentioned tools may be difficult to insert inside the socket of a winch, and therefore these tools may not work as easily as anticipated.

Therefore, it is believed that there is a need in the trucking industry for a winch belt rewinding tool that can be power-driven and easily mountable to the outside surface of the winch's socket where corrosion, dust and dirt are less susceptible of hampering the tool's engagement with the socket.

SUMMARY OF THE INVENTION

In the present invention, however, there is provided a winch-belt rewinding tool that slips over the outside surface of the socket on one end of the winch, and which engages with opposite holes in the socket. The tool is rotated in a working direction by a cordless drill to rewind a belt. The tool is rotated in the opposite direction to disengage it from the socket.

In a first aspect of the present invention, there is provided a tool having a rotational axis and a working axis extending at right angle with the rotational axis, a working direction about the rotational axis, and a releasing direction opposite the working direction. The tool has a C-shaped member having a first and second parallel arms, a transverse portion joining the arms, and a shaft extending from a mid-point on the transverse portion away from the arms along the rotational axis. Each of the arms has a boss protruding from an inside surface thereof, with both bosses protruding toward each other along the working axis. One of the bosses has an inclined end defining a straight side facing the working direction and an inclined surface facing a releasing direction. The other boss has straight sides facing both directions.

The arms are made of a resilient material and the distance between the arms is substantially the same as the diameter of a socket for which the tool is made. The tool is easily engaged over the circumference of the socket by engaging one boss into a hole in the socket and rotating the tool in a clockwise direction around the socket to slide the other boss into an opposite hole. When the tool is rotated in the working direction, the straight sides of the bosses act against the sides of the holes in the socket to rotate the socket. When the tool is rotated in the releasing direction, the inclined surface on one of the bosses causes this boss to climb out of its respective hole to disengage the tool from the socket.

In another aspect of the present invention, the tool has a clevis mounted on the transverse portion thereof, and a pin extending through that clevis and through a diameter of the shaft. The pin is aligned to define an articulation axis of the tool, extending at a right angle from the working axis and the rotational axis. Both the articulation of the shaft about the pin and the articulation of the bosses in the holes of the socket of the winch about the working axis define an universal joint in the tool, to facilitate the use of the tool in conditions where the axis of the shaft is slightly misaligned with the spindle of the winch.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

One embodiment of the present invention is illustrated in the accompanying drawings, in which like numerals denote like parts throughout the several views, and in which:

FIG. 1 is a perspective side and rear view of the winch belt rewinding tool according to the preferred embodiment of the present invention;

FIG. 2 is a partial side view of a winch being worked by the tool according to the preferred embodiment, mounted in a cordless drill;

FIG. 3 is a front view of the tool according to the preferred embodiment.

DESCRIPTION OF THE PREFERRED EMBODIMENT

While this invention is susceptible of embodiment in many different forms, there is shown in the drawings and will be described in details herein one specific embodiment of a winch-belt rewinding tool according to the present invention.

Although efforts have been made to limit the use of exact geometric qualifiers, some narrow expressions remain in this disclosure and are used for convenience only to provide a better understanding of the present invention. Such shapes can vary from one model of tool to the next, to satisfy the shape of different makes of winches. Similarly, the words clockwise and counterclockwise are used herein for convenience only to facilitate the description of the tool according to the preferred embodiment. The directions of rotation and geometric expressions mentioned herein should not be considered as being absolute and limiting.

Referring to FIG. 1, the tool 10 according to the preferred embodiment of the present invention is illustrated therein in its entirety. The preferred tool 10 has a C-shaped member 12 with two arms 14, 16 extending parallel to each other, and a transverse portion 18 joining the two arms. The C-shaped member 12 is preferably made from one piece of flat metal bar. A preferred metal is spring steel but other materials having elastic properties can also be used. The distance between the arms 14, 16 is preferably the same as the diameter of the socket on which the tool is to be used.

A clevis 20 extends from a mid-point on the transverse member 18 away from the arms 14, 16. A shaft 22 is pivotally mounted to the clevis 20 and also extends away from the arms 14, 16. The shaft 22 preferably has a polygonally-shaped portion 24 on its free end for mounting into the chuck of a hand drill.

Each arm 14, 16 has a cylindrical boss 26, 28 mounted on its inside surface. The first boss 26, on arm 14 for example, has a square end. The end of the second boss, however, defines an inclined plane 30 relative to its mounting surface. Both bosses 26, 28 are aligned along a common working axis 32.

The shaft 22 defines an axis of rotation 34 of the tool 10. A pin 36 through the clevis 20 and the shaft 22, along a diameter of the shaft 22, defines an articulation axis 38 of the tool 10.

The shaft 22 is movable about the pin 36 to facilitate the installation of the tool 10 over the socket of a winch.

The transverse member 18 preferably has two holes 40 there through for increasing the flexibility of the C-shape member 12.

In use, the tool 10 is slid over the socket 50 on a winch 52, and the bosses 26, 28 are inserted into a pair of opposite holes 54 through the socket 50, as illustrated in FIG. 2. The mounting of the winch to the flatbed trailer has not been illustrated because that is not the focus of the present invention.

The shaft 22 is held into the chuck of a cordless drill 56. Using the drill, the spindle 58 of the winch is rotated for rewinding the belt 60 on the spindle 58.

The articulation axis 38 preferably makes a right angle from the working axis 32 such that the movement of the bosses in the holes 54 of a socket and the movement of the shaft about the pin 36, jointly form a universal joint, to allow misalignment between the axis of the spindle 58 and the axis of the hand drill 56.

In the preferred embodiment, the tool 10 is rotated in a counterclockwise CCW direction for rewinding a belt 60. The inclined plane 30 faces the clockwise direction CW as shown in FIG. 3 and preferably extends flush with the inside surface of the arm 16. When the tool is rotated in the clockwise direction CW, the boss 28 climbs out of the hole 54 in which it is set for easily disengaging the tool 10 from the socket 50.

The tool 10 is engaged over the socket 50 in a similar manner. The first boss 26 is inserted in a hole 54 and the tool is rotated clockwise CW to engaged the second boss 28 into an opposite hole 54. The inclined surface 30 makes it easy to engage the second boss 28 into a hole 54 to secure the tool 10 over the socket 50.

The first boss 26 has straight sides 62 facing both the clockwise CW and counterclockwise CCW directions. The second boss 28 also has a straight side 62 facing the counterclockwise direction CCW. These straight sides 62 ensure that the bosses do not slip out of the holes 54 when the tool 10 is rotated in a working direction CCW.

It will be appreciated that both bosses 26,28 can have an inclined surface 30 facing a clockwise CW direction to make it still easier to install and to disengage the tool from the socket 50 of a winch.

As to other manner of usage and operation of the present invention, the same should be apparent from the above description and accompanying drawings, and accordingly further discussion relative to the manner of usage and operation of the invention would be considered repetitious and is not provided.

While one embodiment of the tool according to the present invention has been illustrated and described herein above, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

What is claimed is:

1. A tool for rewinding winch belts, comprising;
   a rotational axis and a working axis extending at right angle from said rotational axis, a working direction about said rotational axis, and a releasing direction opposite said working direction;
   a C-shaped member having first and second parallel arms, a transverse portion joining said arms, and a shaft extending from said transverse portion away from said arms along said rotational axis;

each of said arms having a boss protruding therefrom, said bosses protruding toward each other along said working axis;

one of said bosses having an inclined end defining a straight side facing said working direction and an inclined surface facing said releasing direction.

2. The tool as claimed in claim 1, wherein the other of said bosses has a square end and two straight sides facing said working direction and said releasing direction respectively.

3. The tool as claimed in claim 1, further having a clevis on said transverse portion, and a pin extending through said clevis and through a diameter of said shaft; said pin defining an articulation axis extending at a right angle from said working axis and said rotational axis.

4. The tool as claimed in claim 1, further including a polygonal-shaped portion on an end of said shaft.

5. The tool as claimed in claim 1, wherein said transverse portion has two holes there through for reducing a stiffness of said C-shaped member.

6. The tool as claimed in claim 1, wherein said C-shaped member is made of a flat bar of spring steel.

7. The tool as claimed in claim 1, wherein each of said bosses has a cylindrical shape.

8. A tool for rewinding winch belts, comprising;
a rotational axis and a working axis extending at right angle from said rotational axis, a working direction about said rotational axis, and a releasing direction opposite said working direction;
a C-shaped member having first and second parallel arms, a transverse portion joining said arms, and a shaft extending from said transverse portion away from said arms along said rotational axis;
each of said arms having a boss protruding therefrom, said bosses protruding toward each other along said working axis;
a clevis on said transverse portion, and a pin extending through said clevis and through a diameter of said shaft; said pin defining an articulation axis extending at a right angle from said working axis and said rotational axis; and
one of said bosses having an inclined end defining a straight side facing said working direction and an inclined surface facing said releasing direction.

9. The tool as claimed in claim 8, further including a polygonal-shaped portion on an end of said shaft.

10. A tool for rewinding winch belts, comprising;
a rotational axis and a working axis extending at right angle from said rotational axis, a working direction about said rotational axis, and a releasing direction opposite said working direction;
a C-shaped member made of flat bar of spring steel and having first and second parallel arms, a transverse portion joining said arms, and a shaft extending from said transverse portion away from said arms along said rotational axis;
each of said arms having a boss protruding therefrom, said bosses protruding toward each other along said working axis; and
a clevis on said transverse portion, and a pin extending through said clevis and through a diameter of said shaft; said pin defining an articulation axis extending at a right angle from said working axis and said rotational axis.

* * * * *